(12) United States Patent
Payne et al.

(10) Patent No.: US 6,735,614 B1
(45) Date of Patent: *May 11, 2004

(54) CONTACT ALERTS FOR UNCONNECTED USERS

(75) Inventors: John M. Payne, Laguna Beach, CA (US); Timothy A. von Kaenel, Coto De Caza, CA (US)

(73) Assignee: Verus International Group, Limited, New York, NY (US)

( * ) Notice: Subject to any disclaimer, the term of this patent is extended or adjusted under 35 U.S.C. 154(b) by 755 days.

This patent is subject to a terminal disclaimer.

(21) Appl. No.: 09/588,515

(22) Filed: Jun. 6, 2000

Related U.S. Application Data (63) Continuation of application No. 08/970,655, filed on Nov. 14, 1997.
(60) Provisional application No. 60/030,839, filed on Nov. 15, 1996.

(51) Int. Cl.⁷ .............................................. G06F 15/16
(52) U.S. Cl. ........................ 709/203; 709/204; 709/232
(58) Field of Search ................................ 709/200, 203, 709/204, 232; 395/200.3

(56) References Cited

U.S. PATENT DOCUMENTS

| | | |
|---|---|---|
| 4,356,546 A | 10/1982 | Whiteside et al. |
| 4,893,339 A | 1/1990 | Bright et al. |
| 5,008,926 A | 4/1991 | Misholi |
| 5,008,935 A | 4/1991 | Roberts |
| 5,010,317 A | 4/1991 | Schwendeman et al. |
| 5,043,721 A | 8/1991 | May |
| 5,045,852 A | 9/1991 | Mitchell et al. |
| 5,109,486 A | 4/1992 | Seymour |
| 5,136,523 A | 8/1992 | Landers |
| 5,140,419 A | 8/1992 | Galumbeck et al. |
| 5,229,768 A | 7/1993 | Thomason |
| 5,247,614 A | 9/1993 | Eagen et al. |

(List continued on next page.)

OTHER PUBLICATIONS

Ammons, Bill, RBDS for Your Station! Internet, 9/95, Tempe, Arizona.
Motorola, Inc., 'Short Form Address With Message' Protocol Internet, Jun. 21, 1995.

*Primary Examiner*—David Wiley
*Assistant Examiner*—Phuoc Nguyen
(74) *Attorney, Agent, or Firm*—Christopher J. Rourk; Akin Gump Strauss Hauer & Feld, LLP

(57) ABSTRACT

Users access an on-line address service to register their name (which may be a pseudonym or other fictitious or imaginary identity) and a unique contact address that may be used directly or indirectly to address a message over another communication network to an associated listening device. Once a potential user has registered his on-line identity and contact information, other users accessing the address service can then designate one of the listed names, either by selecting the name from a display list of registered names (if all registered names are displayed) or by entering the designated name onto an appropriate form, whereupon the computer hosting the address service will broadcast a message addressed to the identified person's associated listening device. Once the message is received, the listening device notifies the associated user by causing the user's computer to initiate an appropriate visual and/or audio alert display concerning the contact attempt. The user is then given an opportunity to connect to the on-line network and access a designated site to obtain further information about the attempted contact and/or to establish a direct connection with the interactive on-line activity from which the contact attempt originated, at the same time automatically launching any required browser or application software.

16 Claims, 6 Drawing Sheets

U.S. PATENT DOCUMENTS

| | | |
|---|---|---|
| 5,253,294 A | 10/1993 | Maurer |
| 5,281,967 A | 1/1994 | Jung |
| 5,295,244 A | 3/1994 | Dev et al. |
| 5,311,570 A | 5/1994 | Grimes et al. |
| 5,315,635 A | 5/1994 | Kane et al. |
| 5,325,505 A | 6/1994 | Hoffecker et al. |
| 5,341,425 A | 8/1994 | Wasilewski et al. |
| 5,347,632 A | 9/1994 | Filepp et al. |
| 5,367,670 A | 11/1994 | Ward et al. |
| 5,371,499 A | 12/1994 | Graybill et al. |
| 5,377,354 A | 12/1994 | Scannell et al. |
| 5,392,451 A | 2/1995 | Schwendeman et al. |
| 5,394,522 A | 2/1995 | Sanchez-Frank et al. |
| 5,394,537 A | 2/1995 | Courts et al. |
| 5,396,850 A | 3/1995 | Conochie et al. |
| 5,398,021 A | 3/1995 | Moore |
| 5,406,278 A | 4/1995 | Graybill et al. |
| 5,406,279 A | 4/1995 | Anderson et al. |
| 5,423,086 A | 6/1995 | Cannon et al. |
| 5,442,652 A | 8/1995 | Jacobson |
| 5,446,885 A | 8/1995 | Moore et al. |
| 5,452,356 A | 9/1995 | Albert |
| 5,459,458 A | 10/1995 | Richardson et al. |
| 5,481,255 A | 1/1996 | Albert et al. |
| 5,493,892 A | 2/1996 | Sherman |
| 5,504,476 A | 4/1996 | Marrs et al. |
| 5,510,778 A | 4/1996 | Krieter et al. |
| 5,510,808 A | 4/1996 | Cina, Jr. et al. |
| 5,526,363 A | 6/1996 | Weiss et al. |
| 5,530,645 A | 6/1996 | Chu |
| 5,532,694 A | 7/1996 | Mayers et al. |
| 5,537,586 A | 7/1996 | Amram et al. |
| 5,543,781 A | 8/1996 | Ganucheau, Jr. et al. |
| 5,544,320 A | 8/1996 | Konrad |
| 5,544,354 A | 8/1996 | May et al. |
| 5,548,814 A | 8/1996 | Lorang et al. |
| 5,555,446 A | 9/1996 | Jasinski |
| 5,572,643 A | 11/1996 | Judson |
| 5,581,576 A | 12/1996 | Lanzetta et al. |
| 5,581,594 A | 12/1996 | McAfee |
| 5,592,512 A | 1/1997 | Spiess |
| 5,596,318 A | 1/1997 | Mitchell |
| 5,598,894 A | 2/1997 | Burleson et al. |
| 5,602,596 A | 2/1997 | Claussen et al. |
| 5,614,899 A | 3/1997 | Tokuda et al. |
| 5,617,541 A | 4/1997 | Albanese et al. |
| 5,617,565 A | 4/1997 | Augenbraun et al. |
| 5,623,589 A | 4/1997 | Needham et al. |
| 5,623,613 A | 4/1997 | Rowe et al. |
| 5,627,978 A | 5/1997 | Altom et al. |
| 5,634,062 A | 5/1997 | Shimizu et al. |
| 5,675,507 A | 10/1997 | Bobo, II |
| 5,701,302 A | 12/1997 | Geiger |
| 5,732,338 A | 3/1998 | Schwob |
| 5,758,088 A | 5/1998 | Bezaire et al. |
| 5,790,958 A | 8/1998 | McCoy et al. |
| 5,796,394 A | 8/1998 | Wicks et al. |
| 5,808,589 A | 9/1998 | Fergason |
| 5,809,415 A | 9/1998 | Rossmann |
| 5,838,252 A | 11/1998 | Kikinis |
| 5,872,921 A | 2/1999 | Zahariev et al. |
| 5,892,432 A | 4/1999 | Skoog |
| 5,903,262 A | 5/1999 | Ichihashi et al. |
| 5,905,865 A | 5/1999 | Palmer et al. |
| 5,907,793 A | 5/1999 | Reams |
| 5,909,651 A | 6/1999 | Chander et al. |
| 5,954,793 A | 9/1999 | Stutman et al. |
| 6,167,426 A * | 12/2000 | Payne et al. ................ 709/200 |

* cited by examiner

CONTACT ALERTS FOR UNCONNECTED USERS

CLAIM TO PRIORITY

This application is based on, and claims priority from, U.S. Provisional Application 60/030,839 filed Nov. 15, 1996, which is hereby incorporated by reference in its entirety.

CROSS REFERENCE TO RELATED APPLICATION

This application is a continuation of copending application Ser. No. 08/970,655, filed Nov. 14, 1997.

TECHNICAL FIELD

The present invention relates generally to computerized communication systems, and more specifically to method and apparatus for initiating contact with a user who is not currently connected to an interactive on-line communication network such as the Internet.

BACKGROUND

Commonly assigned copending U.S. application Ser. No. 08/788,613 (which corresponds to PCT/US97/01165, published as WO97/27546, but only after the priority date of the present application) discloses a method and apparatus for transmitting addressable messages over a wireless paging network to a receiver connected to the recipient's personal computing device. Upon receipt of the information, the user is alerted by an appropriate visual and/or audible display that there is an incoming message, to which the user is invited to respond, typically by automatically launching an Internet browser, establishing a connection to the Internet, and connecting to a home page or other interactive Internet site identified by a URL embedded in the received message, thereby providing a convenient automated connection back to the information source for obtaining detailed data and/or participating in a designated interactive activity.

However, prior to the present invention, there were no known facilities for a user connected to an on-line communication network such as the Internet to conveniently and automatically invite another user to participate in an interactive Internet activity (such as a game, a chat room, a two-way conversation, or an on-line conference) unless that other user currently had an active on-line connection to that network. This problem was exacerbated if the other user was known only by his on-line "persona," thereby making it impossible to contact him by telephone, fax or other conventional means.

SUMMARY

In a preferred embodiment, users access an on-line address service to register their name (which may be a pseudonym or other fictitious or imaginary identity) and a unique contact address (e.g., a hardwired serial number or a programmable activation number, or an associated password) that may be used directly or indirectly to address a message over another communication network to an associated listening device. In one embodiment, only a list of registered names is accessible to other users, and the unique contact information is protected so that it is available only to the system operator and to the user who originally registered the information. Alternatively, even the registered names are not displayed to other users, who thus must have a priori knowledge of the registered screen name, thereby giving the individual who registered that name more control over who has access to his listening device.

Once a potential user has registered his on-line identity and contact information, other users accessing the address service can then designate one of the listed names, either by selecting the name from a display list of registered names (if all registered names are displayed) or by entering the designated name onto an appropriate form, whereupon the computer hosting the address service will broadcast a message addressed to the identified person's associated listening device. Since the listening device preferably is connected to a wireless communication network that is independent of the on-line communication network, (e.g., the Internet), the designated name can be contacted even if his modem is busy and/or he is not currently connected to the on-line network. Because of bandwidth limitations, the contact message is typically restricted to the address of the device being contacted, a code or token indicating the type of contact desired, and a code or token indicating the Internet address (URL) where the contact is to take place (or where further information may be found). If a sufficient bandwidth is available, the message could also identify the individual attempting the contact and/or could also include a brief personal message from that individual, in which case it would not be necessary for the recipient to go on-line unless he wanted to accept the invitation and/or reply to the message.

Once the message is received, the listening device notifies the associated user by causing the user's computer (or other computing device such as a personal assistant) to initiate an appropriate visual and/or audio alert display concerning the contact attempt. The user is then given an opportunity to connect to the on-line network and access a designated site to obtain further information about the attempted contact and/or to establish a direct connection with the interactive on-line activity (e.g., a two-way telephone or videophone service, a chat room or a game zone) from which the contact attempt originated, at the same time automatically launching any required browser or application software.

The transmission and reception of the contact attempt message, the communication between the wireless receiver and the user's computing device, the generation of the alert display, and the launching of the subsequent on-line connection may be as disclosed in the above referenced PCT application, which is hereby incorporated by reference.

The foregoing and additional features and advantages of this invention will become apparent from the detailed description and accompanying drawing figures that follow. In the figures and written description, numerals indicate the various features of the invention, like numerals referring to like features throughout for both the drawing figures and the written description.

EXEMPLARY EMBODIMENT

Figure 1:
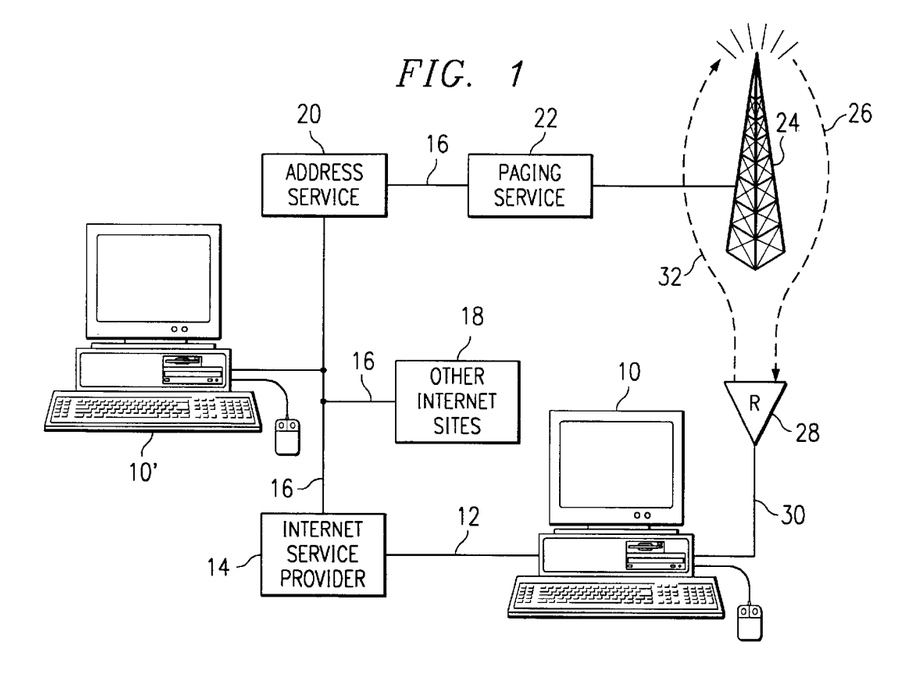
FIG. 1 is a block diagram of a system incorporating a contact address service embodying the present invention.

FIG. 1 is a simplified block diagram showing the basic elements of an exemplary system for implementing the present invention. As shown, a user's personal computer 10 has a two-way connection 12 (typically a wired connection through the local telephone company) to an Internet service provider 14, which in turn is connected by dedicated high speed high capacity communications circuits 16 to various interactive services and information providers 18 including address service 20. Address service 20 in turn communicates with other users 10' the other service providers 18, as well as to a wireless paging service 22, which broadcasts messages to individual subscribers and groups of subscribers via a transmitter 24 and wireless communication link 26, which are received by a receiver 28 connected by means of a serial wired communication line 30 to the user 10. Although the paging network 22, 24, 26, 28 is typically a narrow-bandwidth one-way wireless communication system, many aspects of the present invention are also applicable to a two-way wireless system (option return link 26A between the receiver 28 and the paging service 22) and/or to alerts communicated to the user 10 via a wired connection (for example, via the Internet connection 16) from the paging service 22 that is independent of the transmitter 24 and receiver 28. Similarly, although the connection 12, 16 between the user 10 and the Internet is typically by means of conventional telephone networks employing fiber optic cable and/or copper wire, it could also include wireless links such as two-way cellular telephone circuits, two-way line of sight (microwave) communications links, and uplinks and/or downlinks from communications satellites.

As currently contemplated, the wireless paging service 22 broadcasts not only contact attempt information from address service 20, but also other types of broadcast, narrowcast and pointcast messages from other Internet services 18 (for example, news headlines, stock prices, e-mail, etc), which are combined, encrypted, encoded and packetized prior to transmission and which are received, decrypted, decoded, assembled into messages and filtered, as described in the referenced PCT application. In particular, the receiver 28 is able to determine whether an address field ("capcode") of a particular message corresponds to the receiver's unique serial number, and the personal computer 10 is able to further filter and prioritize messages of possible interest based on message type and content ("virtual capcodes"). However, those skilled in the art will recognize that other known communications apparatus and processes may be utilized to perform some or all of the required functions.

Once the contact information addressed to a particular receiving device 28 has been received and the relevant contact information has been extracted, it is communicated to the associated computing device 10 over the serial communication line 30, where it is further processed by a communication server (for example, the user may not want to receive invitations to participate in gaming) activities during business hours), whereupon an appropriate visual alert is displayed or an appropriate audio alert is generated. Preferably, the alert message is accompanied by the sound of a doorbell, and the on-screen viewer is called up by clicking an animated doorbell icon which is displayed as soon as the alert message is received. If the user confirms his interest (either by clicking on the icon or by opting to view all contact attempts), a pop-up viewer screen appears, whereby the user may establish a two-way interactive connection with the address service 20 via a text or graphics hyperlink to the Internet site identified in the received message.

Figure 2:
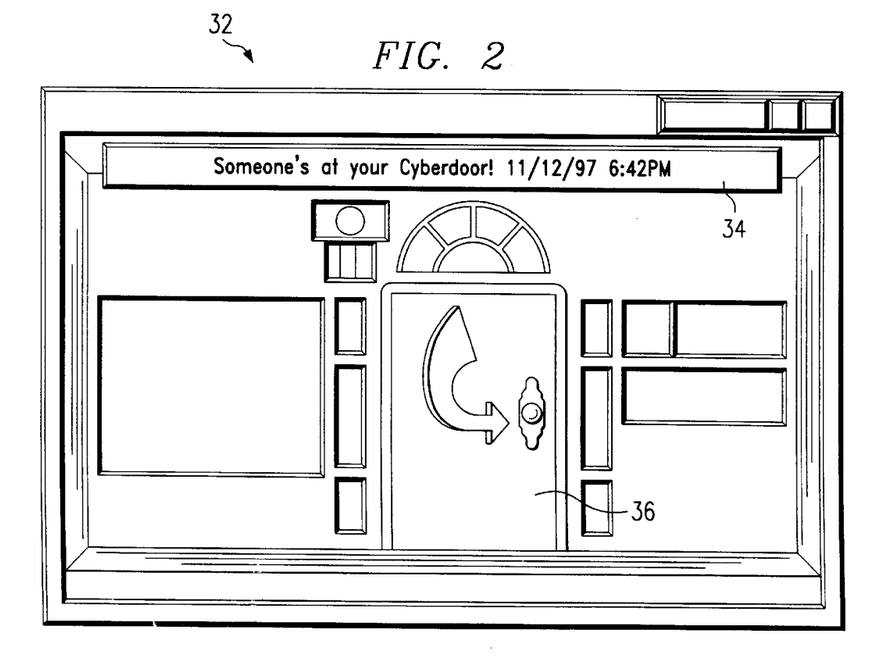
FIG. 2 shows a pop up viewer screen for responding to a contact attempt message from the contact address service.
Figure 3:
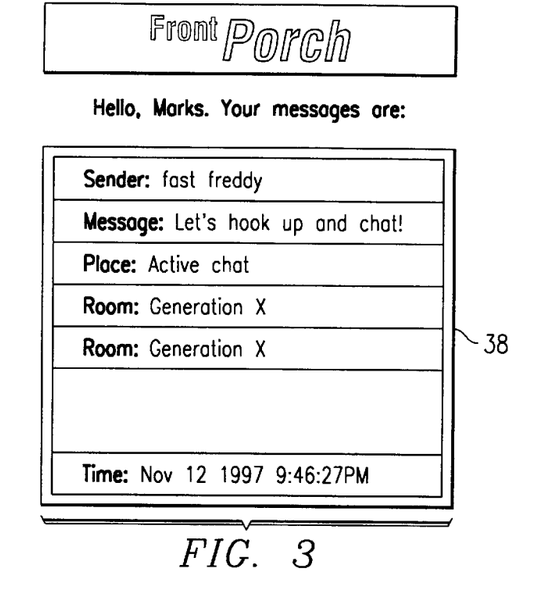
FIG. 3 shows a site on the Internet which the recipient of a contact attempt message may visit to obtain further information about the contact attempt

As shown in FIG. 2 the viewer screen 32 informs the designated person "Someone's at your CyberDoor!" plus the time and day the message 34 was received. By merely clicking on the Front Door icon 36 in the center of the viewer window, any required browser and/or application program and/or aplet is launched, and the user is automatically connected to the "Front Porch" site shown in FIG. 3. Once logged in (which is preferably done transparently from the user's computing device, without any user interaction except to click onto the Front Door icon 36), the user sees a personalized page such as shown in FIG. 3 at which he is advised (box 38) of the identity (screen name or assumed persona) of each contacting party (e.g., "fast freddy") and any message text (e.g., "Let's hook up and chat!") and/or on-line site (e.g., "Active Chat") and location (e.g., "Generation X") that was included in the original contact attempt, but not broadcast over the wireless network for reasons of privacy and/or bandwidth. Preferably, if there is more than one message waiting, the newest is displayed at the top of the page, and the older messages are discarded once a predetermined number of displayed messages or elapsed time has been reached.

Alternately, the message displayed on the viewer window (FIG. 2) could include a hyperlink to the destination on the Internet where the desired contact is to take place and the recipient could accept the invitation by merely clicking on the hyperlink portion of the viewer, whereupon any required browser and/or other application program is automatically launched.

Figure 4:
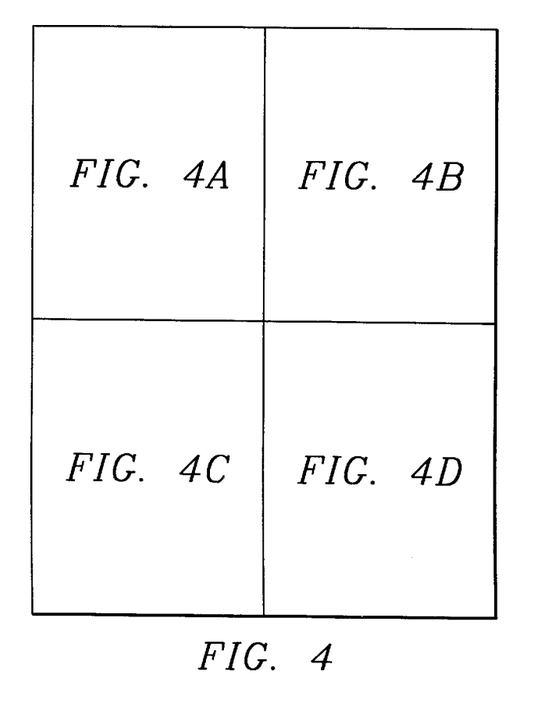
FIG. 4 is a flowchart of various functions performed by the contact address service.
Figure 4A:
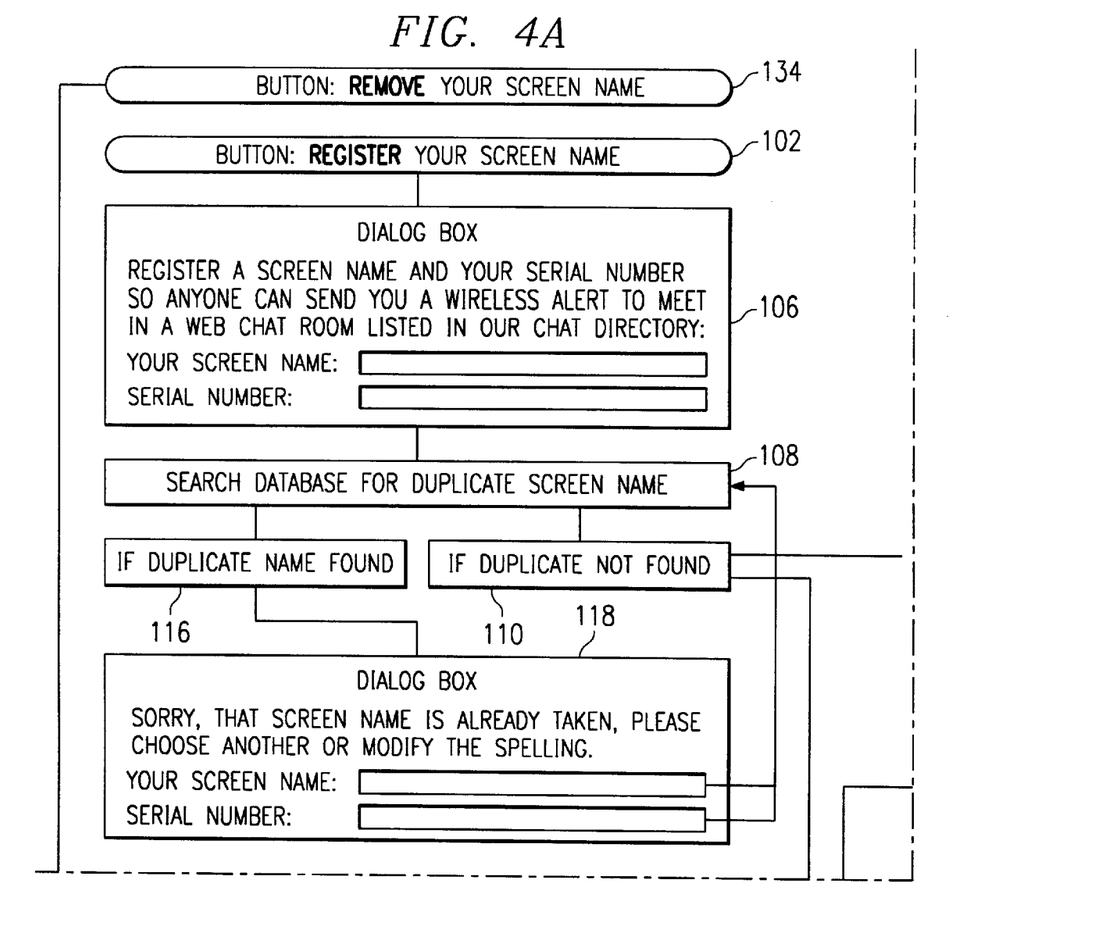
Figure 4B:
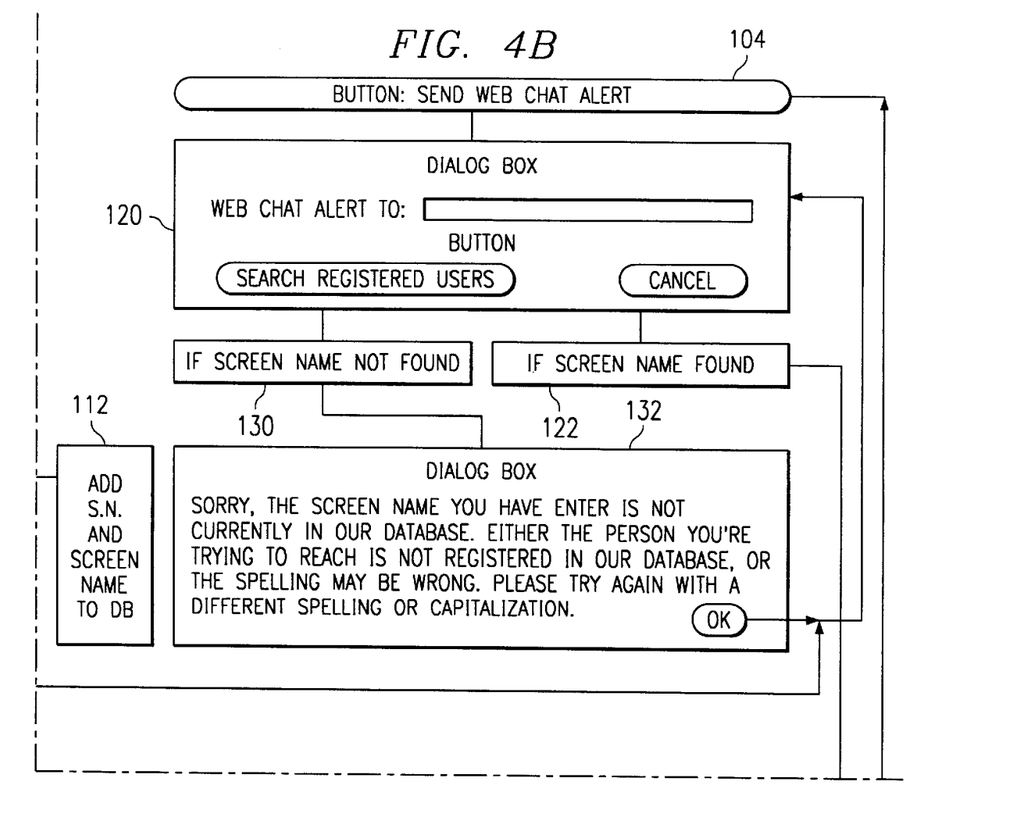
Figure 4C:
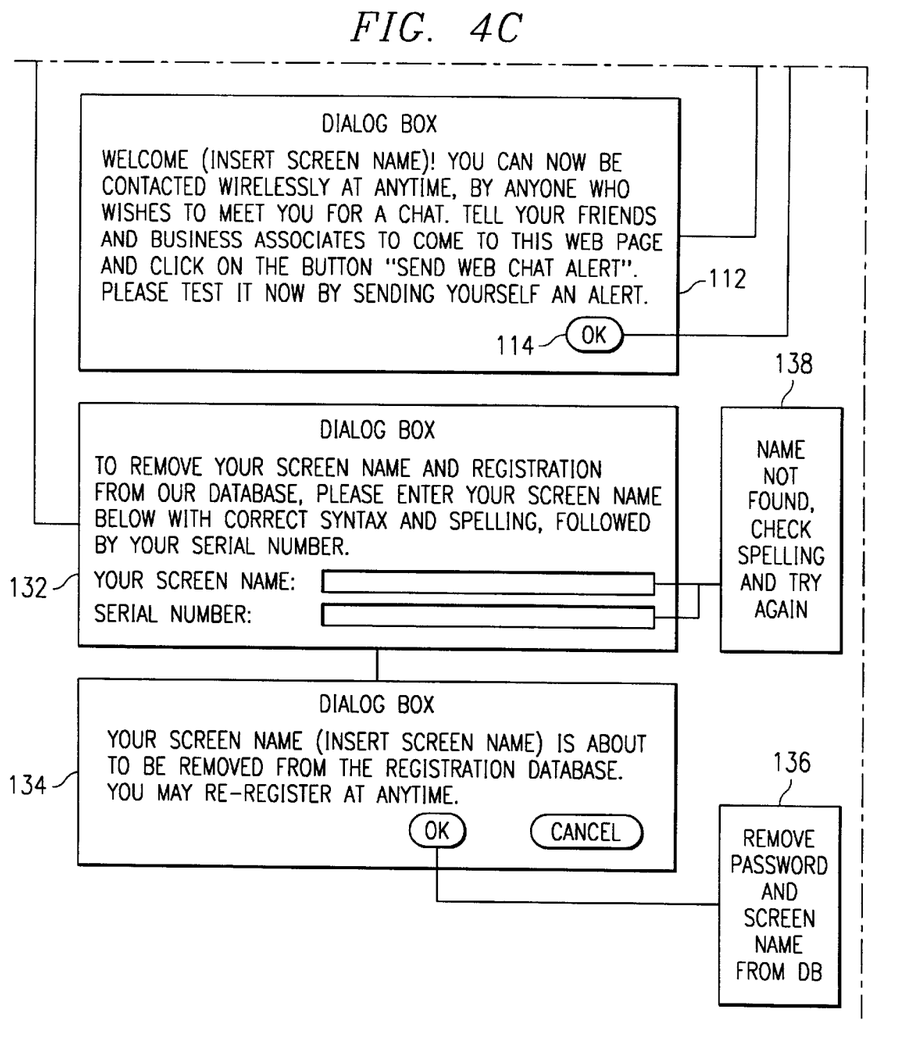
Figure 4D:
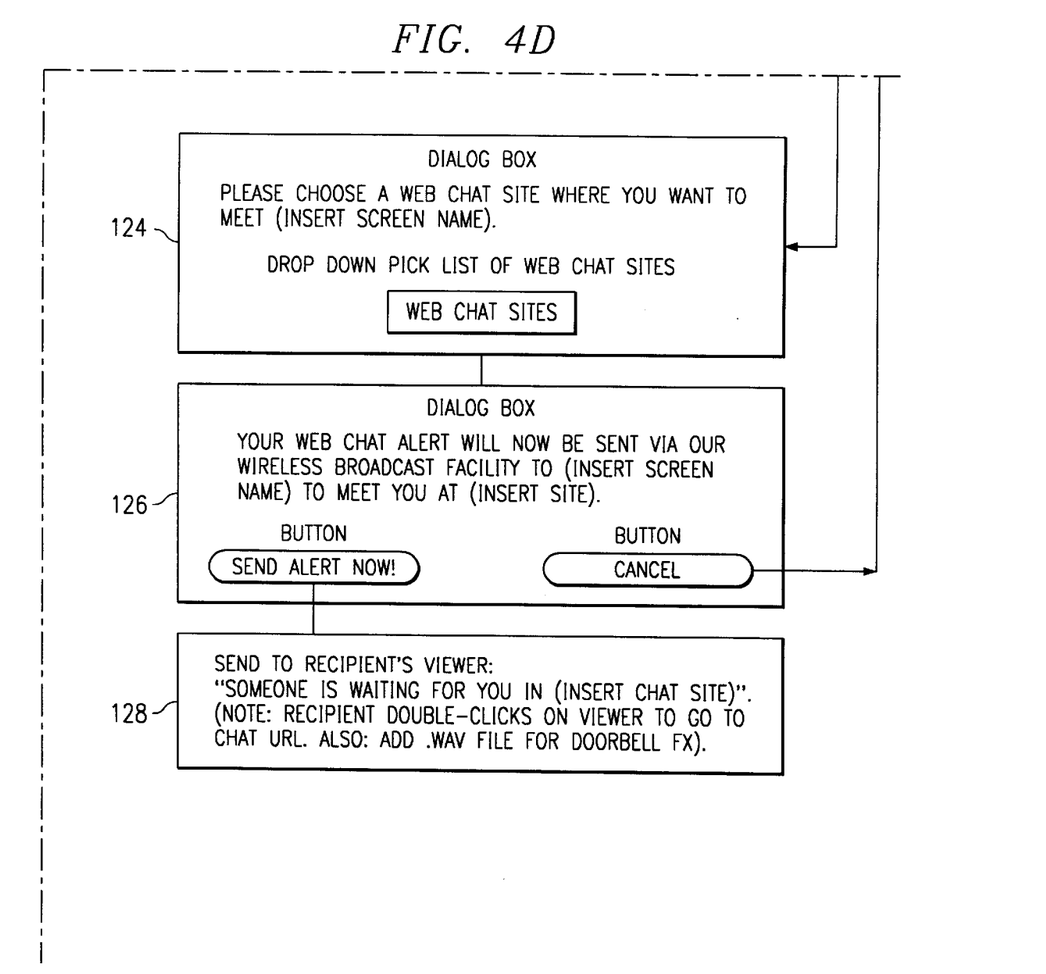

As indicated schematically in the function flow chart of FIG. 4, the address service site has hyperlinks (buttons) to a "Get Rung!" function 102 in which the user is directed to a form for registering his screen name and a "Ring!" function 104 in which the user is directed to a form for sending a web chat alert or other notification to another registered user.

The register function 102 opens a dialog box 106 in which the user can enter his desired screen name and an associated address code, for example the serial number (or activation number) of his wireless receiver. Alternatively, the user could enter a name and associated password under which the wireless receiver was already registered in connection with other Internet services, and the address service will look up the relevant record in the hardware registration database and convert the name and password to the required address code.

Assuming that the newly entered screen name is not already registered to another user (No exit 110 from search block 108), the newly entered screen name and serial number are entered into the data base (block 112) and the user sees a Welcome dialog box 114 in which the user is given an opportunity to activate the Alert function 104 by selecting the OK button. Otherwise, if the selected name is not available (No exit 116 from Search block 108), the user is given an opportunity to select another name (Sorry dialog 118) and the screen name validation process (blocks 108–118) is repeated. In an alternate and presently preferred embodiment (not shown), rather than permitting the newly registered user to immediately test the Alert function, the address service converts the serial number into an activation code which must be entered into the user's computer before any messages can be received from receiver 28.

Referring now to the Alert sending process, once the "Ring!" routine has been entered (block 104), a dialog box 120 appears, in which the user may enter the screen name of the person he is attempting to contact. Once the name has been entered, a search is initiated of all previously registered users, and assuming the name has been registered (and thus the receiver address associated with that person is known to the address service), control passes (found path 122) to a second dialog box 124 for selecting a chat site or other interactive Internet service where the desired contact is to take place. Once the required information has been entered and verified, a confirmation dialog 126 appears and an alert message is sent to the designated user (block 128). Alternatively, the two dialog boxes 120, 126 could be combined on a single display, together with an optional message box. Assuming that the requester identified a particular chat room, game zone, interactive service or other site (preferably selected from a list, so that the site address can be tokenized to make mor efficient use of the limited bandwidth available in the wireless messaging system), the contacted person can go directly to that site, and his computer will automatically activate the required browser software and establish the required connection to the Internet.

If a registered name is not already in the data base that corresponds to the screen name entered in the contact attempt (Not Found branch 130), control passes to a Sorry dialog 132, and the user is given another chance to re-enter the screen name of the person being contacted.

Although not essential, the address service 20 preferably also provides functionality for removing a previously registered name and contact address. To that end, button 134 calls up a removal form (block 136) in which the user enters his previously registered name and an associated password (which could be the aforementioned serial number or activation code). If a match is found and the user clicks the OK button (block 138), the name is removed (block 140). Otherwise (block 142), control returns to the opening menu (buttons 102, 104, 134) and the removal process (blocks 136–140) may be repeated.

It will be appreciated by persons skilled in the art that the present invention is not necessarily limited to what has been shown and described, nor to any unclaimed details of the particular implementation(s) described. For example, the personal computing device and the receiver could be implemented in the form of an intelligent handheld personal communicator adapted to be connected wirelessly to either a 2-way cellular network or to a wireless paging network, the output displays could be synthesized voice prompts, and the input data could be voice commands.

What is claimed is:

1. A method for connecting users to a first communication network, comprising:

providing an address service connected to the first communication network on which a user may register a name and an associated address on a second communication network;

using the first communication network to access the address service;

designating a name registered on the address service;

in response to the designation of said registered name, broadcasting a message over the second communication network to the registered address associated with the selected name, said message identifying an interactive activity to be conducted over the first communication network;

using a receiving device not connected to the first communication network to receive said message; and in response to the reception of said message by said receiving device, automatically generating a user prompt to alert said user of said message.

2. The method of claim 1 further comprising:

in response to an acknowledgement of said user prompt, connecting an interactive device to the first communication network and commencing the identified interactive activity.

3. The method of claim 1, wherein the user prompt includes an audio prompt.

4. The method of claim 1, wherein the user prompt includes a visual prompt.

5. The method of claim 1, wherein the user prompt includes a request to connect an interactive device to the first communication network.

6. The method of claim 1, wherein the first communication is the Internet, and the second communication network is a wireless paging network.

7. The method of claim 6, wherein the user prompt comprises a hyperlink to a site of the Internet.

8. The method of claim 7, wherein said Internet site includes a display of further information about the attempted contact.

9. The method of claim 8, wherein said further information includes information identifying the person from whom the contact attempt originated.

10. The method of claim 6, wherein each user registers a screen name and an associated contact address of an associated listening device.

11. The method of claim 10, wherein said screen name is a pseudonym or other factitious or imaginary identity.

12. The method of claim 10, wherein said contact address is a serial number programmed into the associated listening device.

13. The method of claim 10, wherein said contact address is converted into an activation code by the address service.

14. The method of claim 13, wherein said activation code is available only to the address service and to the user who originally registered the information.

15. The method of claim 8, wherein said further information includes a message from the person from whom the contact attempt originated.

16. The method of claim 8, wherein said further information includes information identifying a particular interactive Internet activity.

* * * * *

INTER PARTES REEXAMINATION CERTIFICATE (1121st)
United States Patent
Payne et al.

(10) Number: US 6,735,614 C1
(45) Certificate Issued: *Jun. 2, 2015

(54) CONTACT ALERTS FOR UNCONNECTED USER

(75) Inventors: John M. Payne, Laguna Beach, CA (US); Timothy A. von Kaenel, Coto De Caza, CA (US)

(73) Assignee: SIMPLEAIR, INC., Plano, TX (US)

Reexamination Request:
No. 95/000,631, May 3, 2011

Reexamination Certificate for:
Patent No.: 6,735,614
Issued: May 11, 2004
Appl. No.: 09/588,515
Filed: Jun. 6, 2000

(*) Notice: This patent is subject to a terminal disclaimer.

Related U.S. Application Data

(63) Continuation of application No. 08/970,655, filed on Nov. 14, 1997, now Pat. No. 6,167,426.

(60) Provisional application No. 60/030,839, filed on Nov. 15, 1996.

(51) Int. Cl.
    *H04L 29/12*     (2006.01)
    *H04L 29/06*     (2006.01)
    *H04L 12/58*     (2006.01)
    *H04L 29/08*     (2006.01)

(52) U.S. Cl.
    CPC .............. *H04L 12/587* (2013.01); *H04L 51/24* (2013.01); *H04L 29/12047* (2013.01); *H04L 69/329* (2013.01); *H04L 61/15* (2013.01); *H04L 29/06* (2013.01)

(58) Field of Classification Search
    None
    See application file for complete search history.

(56) References Cited

To view the complete listing of prior art documents cited during the proceeding for Reexamination Control Number 95/000,631, please refer to the USPTO's public Patent Application Information Retrieval (PAIR) system under the Display References tab.

*Primary Examiner* — Matthew Heneghan (57) ABSTRACT

Users access an on-line address service to register their name (which may be a pseudonym or other fictitious or imaginary identity) and a unique contact address that may be used directly or indirectly to address a message over another communication network to an associated listening device. Once a potential user has registered his on-line identity and contact information, other users accessing the address service can then designate one of the listed names, either by selecting the name from a display list of registered names (if all registered names are displayed) or by entering the designated name onto an appropriate form, whereupon the computer hosting the address service will broadcast a message addressed to the identified person's associated listening device. Once the message is received, the listening device notifies the associated user by causing the user's computer to initiate an appropriate visual and/or audio alert display concerning the contact attempt. The user is then given an opportunity to connect to the on-line network and access a designated site to obtain further information about the attempted contact and/or to establish a direct connection with the interactive on-line activity from which the contact attempt originated, at the same time automatically launching any required browser or application software.

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-6 and 10-12 are cancelled.

Claims 7-9 and 13-16 were not reexamined.

\* \* \* \* \*